(12) United States Patent
Su et al.

(10) Patent No.: US 11,378,294 B2
(45) Date of Patent: Jul. 5, 2022

(54) AIR CONDITIONER CURRENT LOOP COMMUNICATION CIRCUIT AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Lizhi Su, Foshan (CN); Zhaojing Huo, Foshan (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 261 days.

(21) Appl. No.: 16/750,445

(22) Filed: Jan. 23, 2020

(65) Prior Publication Data
US 2020/0158364 A1 May 21, 2020

Related U.S. Application Data

(63) Continuation of application No. PCT/CN2017/113502, filed on Nov. 29, 2017.

(30) Foreign Application Priority Data

Aug. 4, 2017 (CN) .......................... 201710665388.0

(51) Int. Cl.
*H04B 3/02* (2006.01)
*F24F 11/46* (2018.01)
(Continued)

(52) U.S. Cl.
CPC .......... *F24F 11/46* (2018.01); *G05B 19/0428* (2013.01); *H02M 3/33569* (2013.01);
(Continued)

(58) Field of Classification Search
CPC ............... H04B 3/02; H04B 3/54; H04B 5/00
See application file for complete search history.

(56) References Cited

U.S. PATENT DOCUMENTS 5,455,490 A * 10/1995 Callahan ................. F21V 23/06
315/194
2008/0054084 A1 3/2008 Olson
(Continued)

FOREIGN PATENT DOCUMENTS

CN 1080697 A 1/1994
CN 202109612 U 1/2012
(Continued)

OTHER PUBLICATIONS

World Intellectual Property Organization (WIPO) International Search Report for PCT/CN2017/113502 dated Apr. 28, 2018 6 Pages.
(Continued)

*Primary Examiner* — Qutbuddin Ghulamali
(74) *Attorney, Agent, or Firm* — Anova Law Group, PLLC

(57) ABSTRACT

An air conditioner current loop communication circuit includes an indoor unit current loop communication circuit and an outdoor unit current loop communication circuit connected to each other via a communication connection wire and an AC power connection wire to form a current loop communication loop, an indoor microcontroller unit (MCU) and an outdoor MCU configured to communicate with each other through the current loop communication loop, and a switching power supply circuit connected in series to the communication connection wire or the AC power connection wire and configured to output a DC power to the current loop communication loop.

15 Claims, 6 Drawing Sheets

(51) Int. Cl.
  *G05B 19/042* (2006.01)
  *H02M 3/335* (2006.01)
  *H02M 1/44* (2007.01)
  *H04B 3/54* (2006.01)
(52) U.S. Cl.
  CPC ..... *H04B 3/02* (2013.01); *G05B 2219/25191* (2013.01); *G05B 2219/25257* (2013.01); *G05B 2219/2638* (2013.01); *H02M 1/44* (2013.01); *H04B 3/54* (2013.01)

(56) References Cited

U.S. PATENT DOCUMENTS

| | | | |
|---|---|---|---|
| 2008/0298968 | A1 | 12/2008 | Frampton et al. |
| 2009/0072108 | A1 | 3/2009 | Oleson |
| 2013/0218351 | A1 | 8/2013 | Warren et al. |
| 2016/0211683 | A1* | 7/2016 | Peabody ............... H02J 7/0027 |

FOREIGN PATENT DOCUMENTS

| | | |
|---|---|---|
| CN | 202178711 U | 3/2012 |
| CN | 202334333 U | 7/2012 |
| CN | 103017259 A | 4/2013 |
| CN | 203272206 U | 11/2013 |
| CN | 103837820 A | 6/2014 |
| CN | 104154604 A | 11/2014 |
| CN | 104345729 A | 2/2015 |
| CN | 104596049 A | 5/2015 |
| CN | 104776559 A | 7/2015 |
| CN | 204478392 U | 7/2015 |
| CN | 204787051 U | 11/2015 |
| CN | 106225105 A | 12/2016 |
| JP | H05316727 A | 11/1993 |
| JP | 0694289 A | 4/1994 |
| JP | 2001045752 A | 2/2001 |
| JP | 2003287264 A | 10/2003 |
| JP | 3835174 B2 | 10/2006 |
| JP | 2009097760 A | 5/2009 |
| JP | 2012060855 A | 3/2012 |
| JP | 2017123735 A | 7/2017 |
| WO | 2016045052 A1 | 3/2016 |

OTHER PUBLICATIONS

World Intellectual Property Organization (WIPO) Written Opinion for PCT/CN2017/113502 with translation dated Apr. 28, 2018 6 Pages.
Japan Patent Office (JPO) Decision of Refusal For JP Application No. 2020-503021 dated Sep. 14, 2021 8 Pages (Translation Included).
The European Patent Office (EPO) Extended Search Report for EP Application No. 17920529.9 dated Mar. 24, 2020 8 Pages.
Japan Patent Office Reasons for Refusal For Japanese Application No. 2020503021 dated Jan. 5, 2021 8 Pages (including English translation).
Japan Patent Office Search Report For Japanese Application No. 2020503021 with translation dated Dec. 21, 2020 29 Pages.
The State Intellectual Property Office of PRC (SIPO) The Second Office Action For CN Application No. 201710665388.0 dated Jan. 18, 2021 7 Pages (Translation Included ).
The State Intellectual Property Office of PRC (SIPO) The First Office Action For CN Application No. 201710665388.0 dated Jul. 24, 2020 20 Pages (Translation Included ).

* cited by examiner

AIR CONDITIONER CURRENT LOOP COMMUNICATION CIRCUIT AND AIR CONDITIONER

CROSS-REFERENCE TO RELATED APPLICATIONS

This application is a continuation of International Application No. PCT/CN2017/113502, filed Nov. 29, 2017, which claims priority to Chinese Application No. 201710665388.0, filed Aug. 4, 2017, the entire contents of both of which are incorporated herein by reference.

TECHNICAL FIELD

The present disclosure relates to the technical field of indoor and outdoor communication circuits of an air conditioner, and in particular, to an air conditioner current loop communication circuit and an air conditioner.

BACKGROUND

At present, the communication between indoor and outdoor units of home air conditioner is generally implemented by a current loop communication circuit. The current loop communication is implemented by three wires, namely, the AC power live wire L, the AC power neutral wire N, and a communication wire S. As shown in FIG. 1, the indoor unit communicates with the outdoor unit through the current loop communication circuit composed by wire L, wire N, and wire S. The communication loop of the current loop communication circuit needs to be provided with a DC power such as 24V DC power to work normally. The DC power supply circuit includes a voltage dividing resistor that divides the AC power source, a diode for rectification, and a voltage regulator diode for simple voltage stabilization. Since the voltage shared by the voltage dividing resistor is high, there is a large power consumption during the operation of the voltage dividing resistor, which causes severe heat generation, and the volume of the voltage dividing resistor is relative large compared to other components, which is also not conducive to the PCB layout of the current loop communication circuit.

SUMMARY

The main objective of the present disclosure is to provide an air conditioner current loop communication circuit and an air conditioner, which aim to solve the problems in the existing current communication loop circuit of the air conditioner of serious heat generation due to the large power consumption of the voltage divider resistor, and impact on PCB layout due to the large volume of the voltage divider resistor.

In order to achieve the above objective, the present disclosure provides an air conditioner current loop communication circuit, including: an indoor unit current loop communication module, an outdoor unit current loop communication module, an indoor MCU, an outdoor MCU, and a switching power supply module.

The indoor unit current loop communication module is connected to the outdoor unit current loop communication module through a communication connection S wire and an AC power connection wire to form a current loop communication loop; the indoor MCU is configured to communicate with the outdoor MCU through the current loop communication loop; and the switching power supply module is serially connected to the communication connection S wire or the AC power connection wire to output a DC power to the current loop communication loop.

In an embodiment of the present disclosure, the AC power connection wire is an AC power N wire. The switching power supply module is at an air condition indoor unit side, a positive pole of an output end of the switching power supply module is connected to the AC power N wire, and a negative pole of the output end of the switching power supply module is connected to the indoor unit current loop communication module. Alternatively, the switching power supply module is at an air conditioner outdoor unit side, a positive pole of an output end of the switching power supply module is connected to the AC power N wire, and a negative pole of the output end of the switching power supply module is connected to the outdoor unit current loop communication module.

In an embodiment of the present disclosure, the AC power connection wire is an AC power L wire. The switching power supply module is at an air conditioner indoor unit side, a positive pole of an output end of the switching power supply module is connected to the AC power L wire, and a negative pole of the output end of the switching power supply module is connected to the indoor unit current loop communication module. Alternatively, the switching power supply module is at an air conditioner outdoor unit side, a positive pole of an output end of the switching power supply module is connected to the AC power L wire, and a negative pole of the output end of the switching power supply module is connected to the outdoor unit current loop communication module.

In an embodiment of the present disclosure, the switching power module includes a switching transformer. The switching transformer includes a first output winding.

The first output winding is configured to output a first DC to the current loop communication loop to provide a DC power source.

In an embodiment of the present disclosure, the air conditioner current loop communication circuit further includes a unidirectional protection module.

The unidirectional protection module is connected in series in the current loop communication loop to provide a unidirectional DC path for the current loop communication loop.

In an embodiment of the present disclosure, the unidirectional protection module comprises: a first unidirectional protection module connected in series in an indoor unit part of the current loop communication loop; and a second unidirectional protection module connected in series in an outdoor unit part of the current loop communication loop.

In an embodiment of the present disclosure, the first unidirectional protection module comprises a first diode, and the second unidirectional protection module comprises a second diode.

In an embodiment of the present disclosure, the air conditioner current loop communication circuit further includes an overcurrent protection module.

The overcurrent protection module is connected in series in the current loop communication loop to provide an overcurrent protection for the current loop communication loop.

In an embodiment of the present disclosure, the overcurrent protection module is a PTC resistor.

The PTC resistor is connected in series in the current loop communication loop.

In order to achieve the above objective, the present disclosure further provides an air conditioner, including the air conditioner current loop communication circuit described above.

The present disclosure provides an air conditioner current loop communication circuit. The air conditioner current loop communication circuit includes the switching power supply module connected in series to the communication connection S wire or the AC power connection wire to output the direct current to the current loop communication loop. In the present disclosure, the DC power output from the switching power supply module is configured to replace the existing resistance voltage divider type DC power supply circuit, and is compatible with the existing current loop communication circuit connecting wires between the indoor unit and outdoor unit of the air conditioner, which solves the problems in the existing resistance voltage divider that the large power consumption of the voltage divider resistor causes large heat generation, and that the large volume of the voltage divider resistor is not suitable to the PCB layout.

DETAILED DESCRIPTION OF THE EMBODIMENTS

Figure 1:
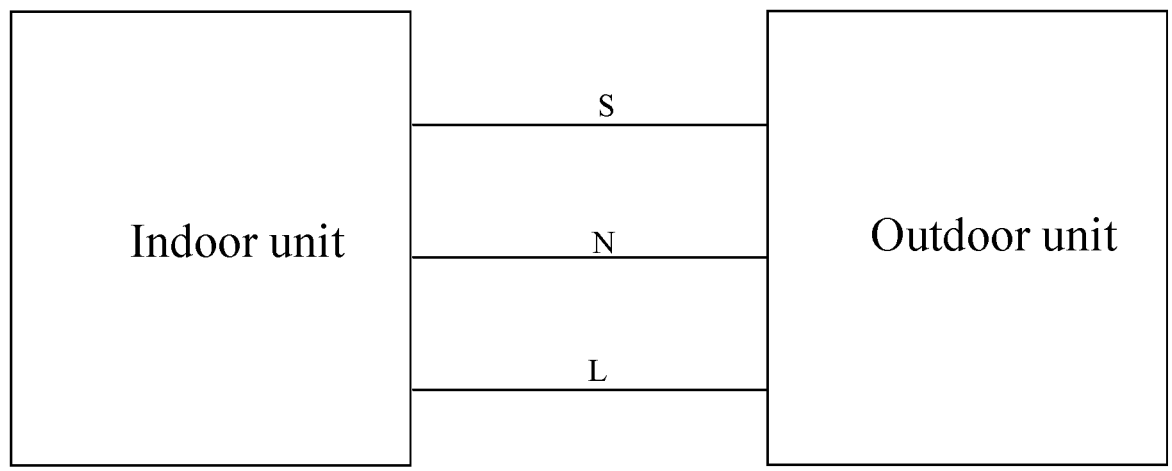
FIG. 1 is a schematic diagram of a current loop communication connection wire of an indoor unit and an outdoor unit of an air conditioner according to the related art.

The embodiments of the present disclosure are described in detail below. Examples of the embodiments are shown in the drawings. The same or similar reference numerals represent the same or similar elements or elements having the same or similar functions. The embodiments described below with reference to the drawings are exemplary and are intended to explain the present disclosure, but should not be construed as limiting the present disclosure.

Figure 2:
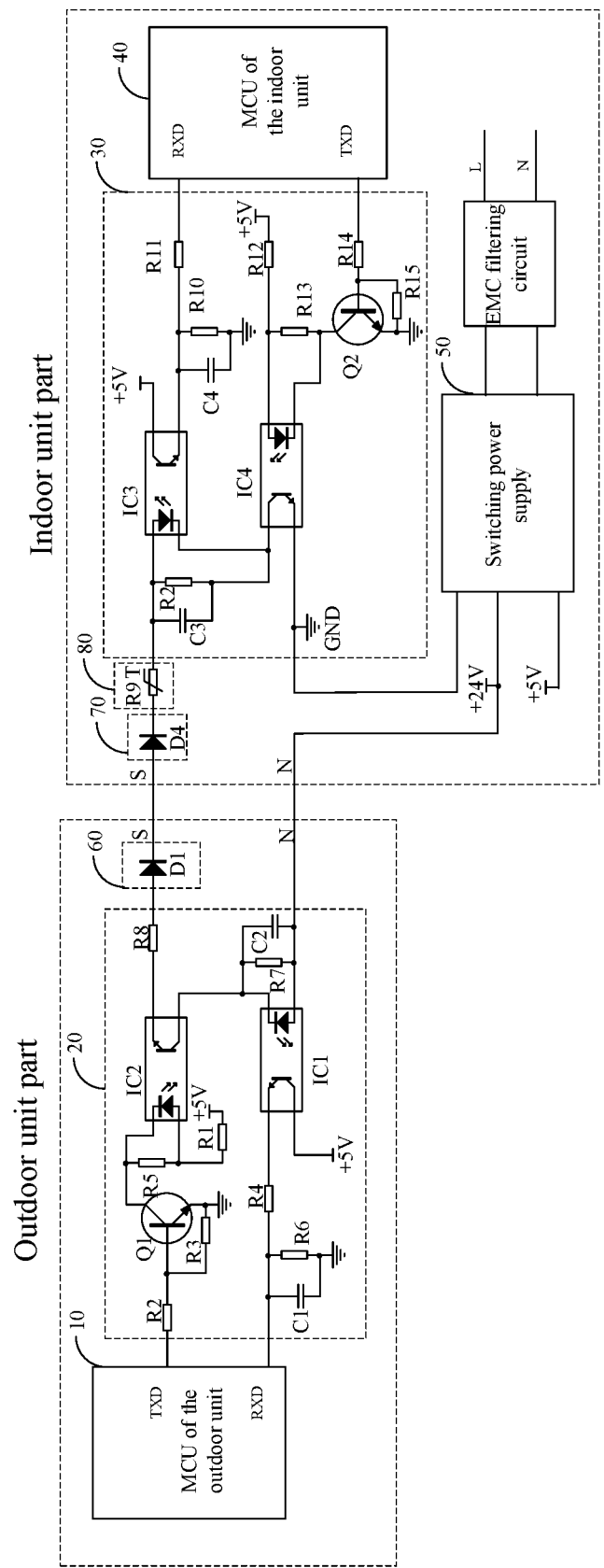
FIG. 2 is a circuit structural diagram of the air conditioner current loop communication circuit according to an embodiment of the present disclosure.

Referring to FIG. 2, FIG. 2 is a structural diagram of a current loop communication circuit module of an air conditioner according to an embodiment of the present disclosure. For convenience of explanation, only parts related to the embodiment of the present disclosure are shown, and details thereof are described below.

The air conditioner current loop communication circuit provided by the embodiment of the present disclosure includes an outdoor microcontroller unit (MCU) 10, an outdoor unit current loop communication module 20 (outdoor unit current loop communication circuit), an indoor unit current loop communication module 30 (indoor unit current loop communication circuit), an indoor MCU 40, and a switching power supply module 50 (switching power supply circuit).

The indoor unit current loop communication module 30 is connected to the outdoor unit current loop communication module 20 through a communication connection S wire (communication connection wire, communication wire, S wire, or wire S) and an AC power connection wire to form a current loop communication loop. The indoor MCU 40 is configured to communicate with the outdoor MCU 10 through the current loop communication loop; and the switching power supply module 50 is serially connected to the communication connection S wire or the AC power connection wire to output a DC power to the current loop communication loop.

In some embodiments, as shown in FIG. 2, the air conditioner current loop communication circuit of the present disclosure includes a part for the indoor unit (also referred to as an "indoor unit part" or "indoor part" of the air conditioner current loop communication circuit) and a part for the outdoor unit (also referred to as an "outdoor unit part" or "outdoor part" of the air conditioner current loop communication circuit).

The indoor unit part of the current loop communication circuit includes the indoor unit current loop communication module 30, the indoor MCU 40, and the switching power supply module 50 at the indoor unit side.

The outdoor unit part of the current loop communication circuit includes an outdoor unit current loop communication module 20 (outdoor unit current loop communication circuit) and the outdoor MCU 10.

Based on the communication between the indoor MCU 40 and the outdoor MCU 10, the indoor unit can communicate with the outdoor unit normally to realize the control and status information transmission and reception between the two.

The indoor unit current loop communication module 30 mainly includes a photocoupler IC3, a photocoupler IC4, and a transistor Q2. The photocoupler IC3 is responsible for the communication reception of the indoor unit part of the current loop communication circuit. One end of the phototransistor of photocoupler IC3 is connected to the signal reception pin RXD of the indoor MCU 40. One end of the light emitting diode of photocoupler IC3 is an input end of the indoor unit current loop communication module 30. The communication of the indoor unit includes input from the input end, and then output from one end of the phototransistor to the MCU 40, so that the indoor MCU reads the received data of the communication. The photocoupler IC4 is responsible for the communication transmission of the indoor part of the current loop communication circuit. One end of the light-emitting diode of photocoupler IC4 is connected to the collector of the transistor Q2, and the base of the transistor Q2 is connected to the signal transmission pin TXD of the MCU 40. The communication signal sent by MCU 40 is driven by the transistor Q2 and then sent to one end of the light-emitting diode of photocoupler IC4. One end of the phototransistor of photocoupler IC4 is the output end of the indoor unit current loop communication module 30, so that the communication signal sent by MCU 40 is output from the output end.

The outdoor unit current loop communication module 20 mainly includes a photocoupler IC1, a photocoupler IC2, and a transistor Q1. The photocoupler IC1 is responsible for the communication reception of the outdoor part of the current loop communication circuit. One end of the phototransistor of photocoupler IC1 is connected to the signal reception pin RXD of the outdoor MCU 10. One end of the light emitting diode of photocoupler IC1 is an input end of the outdoor unit current loop communication module 20. The communication of the outdoor unit includes input from the input end, and then output from one end of the phototransistor to the MCU 10, so that the outdoor MCU reads the received data of the communication. The photocoupler IC2 is responsible for the communication transmission of the outdoor part of the current loop communication circuit. One end of the light-emitting diode of photocoupler IC2 is connected to the collector of the transistor Q1, and the base of the transistor Q1 is connected to the signal transmission pin TXD of the MCU 10. The communication signal sent by MCU 10 is driven by the transistor Q1 and then sent to one end of the light-emitting diode of photocoupler IC2, to receive the communication signal sent by MCU 10. One end of the phototransistor of photocoupler IC2 is the output end of the outdoor unit current loop communication module 20, so that the communication signal sent by MCU 10 is output from the output end.

The switching power supply module 50 located at the indoor unit is connected in series to the AC power N wire (AC power neutral wire), and outputs the first DC power to provide the DC power for the current loop communication loop described above. In some embodiments, the switching power supply module 50 outputs multiple direct currents. An independent winding of the switching transformer of the switching power supply module 50, that is, the first winding, outputs the first DC power to the above-mentioned current loop communication loop to provide DC power. As shown in FIG. 2, The switching power supply module 50 outputs an independent +24V DC power to supply DC power to the current loop communication loop. The positive terminal of the output end of the switching power supply module 50 is connected to the AC power N wire, and the negative terminal of the output end of the switching power supply module 50 is connected to the indoor unit current loop communication module 30. Since three wires, namely L, N, and S, are connected between the indoor unit and the outdoor unit of the air conditioner to realize current loop communication and transmission of AC power, the positive pole of the 24V DC power output from the switching power supply 50 is connected to the N wire of the AC power, that is, the positive pole of the DC power supply in the communication loop is shared with the N wire, thus the three communication connection wires of the current loop of the indoor unit and the outdoor unit are commonly used. The connection wire L between the indoor unit and the outdoor unit are not shown in the figure. In fact, the AC power transmission to the indoor unit and the outdoor unit is realized through the L and N wires. In FIG. 2, the 24V positive pole is input from the N wire of the indoor unit side to the current loop communication loop. The direct current is returned to the DC 24V negative pole via the N wire of the outdoor unit side to a photocoupler IC1 of the outdoor unit side, a photocoupler IC2 of the outdoor unit side, a photocoupler IC3 of the indoor unit side, and a photocoupler IC4 of the indoor unit side. The negative pole of 24V is connected to the indoor unit current loop communication module 30, for example, the output end of the communication module 30. The negative pole of 24V is also the common ground wire of the output of the current loop communication module 30, for example, the emitter of the transistor of the photocoupler IC4. In addition to the +24V provided by the switching power supply module 50, other windings of switching transformer of the switching power supply module 50 also output other DC power. For example, the second winding of the switching transformer outputs a second DC power of +5V, and its DC negative pole is shared with the 24V negative pole to provide the DC power needed for the indoor MCU to work. The switching power supply module 50 can also output other direct currents to provide DC power for other operations of the entire outdoor unit circuit, that is, the switching power supply module 50 provides direct current for the entire outdoor unit circuit. Compared with the existing outdoor circuit power supply, the switching transformer of the switching power supply module 50 consistent with the present disclosure adds a winding to output a set of separate DC power to provide DC power for the current loop communication loop. In the existing art, the DC power supply of the current loop communication loop includes a voltage dividing resistor that divides the AC power source, a diode for rectification, and a voltage regulator diode for simple voltage stabilization. Thus, compared with the existing DC power supply of the current loop communication loop, the DC power supply of the current loop communication loop of the present disclosure eliminates the voltage divider resistor which generate a large amount of heat due to excessive power consumption, and since the winding output is only extended on the existing switching power supply, the PCB layout of the current loop communication circuit is also simple, and there are no large-volume components.

Figure 3:
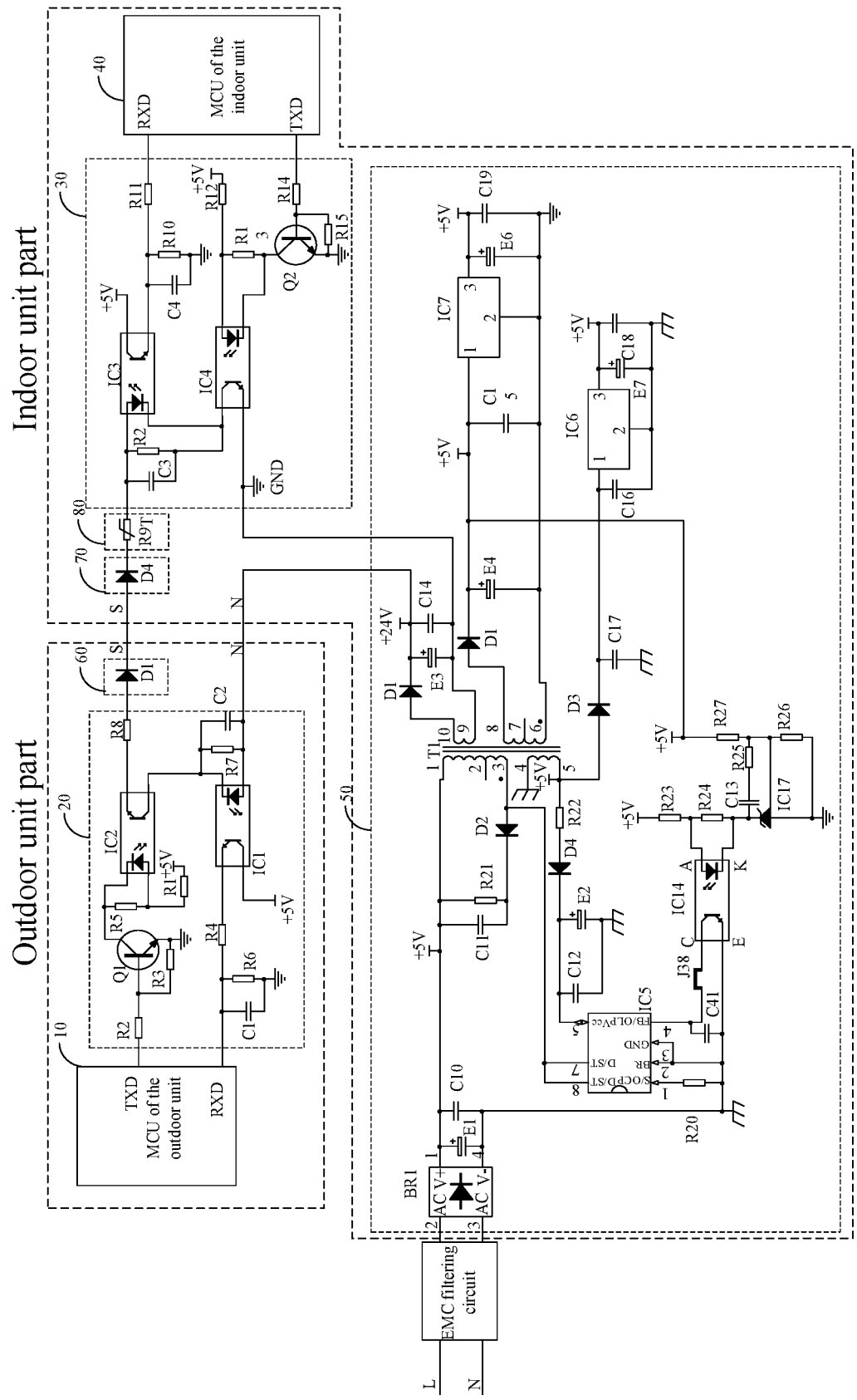
FIG. 3 is a specific circuit structure diagram of the switching power supply module in FIG. 2.

FIG. 3 is a circuit diagram showing details of the switching power supply module 50 at the indoor unit side. The switching power supply of the switching power supply module 50 mainly includes switching power supply control chip IC5, switching transformer T1, voltage feedback photocoupler IC14, voltage stabilization chip IC7 and IC6. The switching transformer T1 has two output windings, and the AC powers output by the two windings undergo rectification by diodes and regulation by the voltage regulator chips, and become two DC power outputs: 24V that provides DC power for the current loop communication loop and 5V that provides indoor MCU 40 with power required for work.

The switching power supply module 50 in the above FIG. 2 and FIG. 3 is connected in series to the N wire of the AC power supply, or may be connected in series to the communication connection S wire. Since the indoor unit current loop communication module 30 is connected to the outdoor unit current loop communication module 20 through the communication connection S wire and the AC power connection wire L or N to form a current loop communication loop, and the switching power supply module 50 is configured to provide DC power for the current loop communication loop, whether the switching power supply module 50 is connected in series on the communication connection S wire or in series with the AC power connection wire L or N, the normal operation of the current loop communication loop can be achieved.

Figure 4:
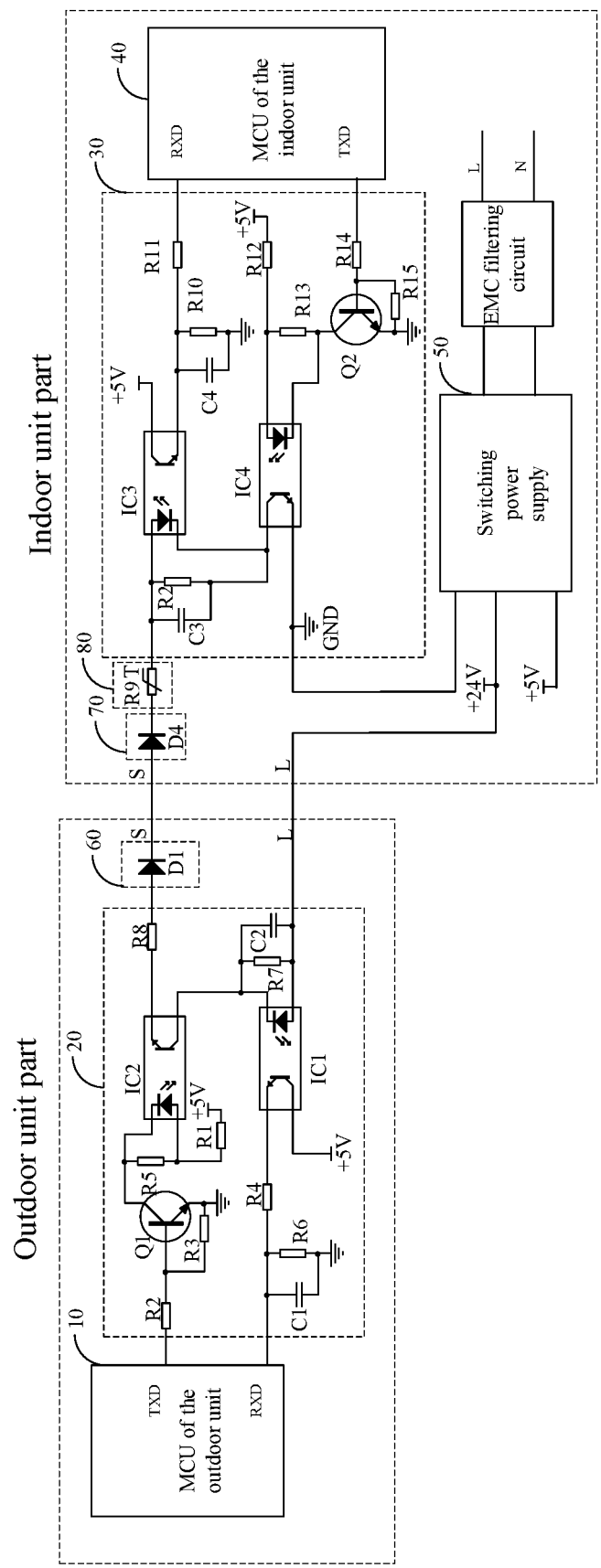
FIG. 4 is another circuit structural diagram of the air conditioner current loop communication circuit according to an embodiment of the present disclosure.

Further, the air conditioner current loop communication circuit shown in FIG. 4 differs from the air conditioner current loop communication circuit shown in FIG. 2 in that, in FIG. 4, the switching power supply module 50 is connected in series with the L wire of the AC power supply, the positive pole (+24V) of the output end of the switching power supply module 50 is connected to the L wire of the AC power supply, and the negative pole of the output end of the switching power supply module 50 is connected to the indoor unit current loop communication module 30. In FIG. 4, the AC power N wire is not shown. The AC power transmission for the indoor unit and the outdoor unit is through the L and N wires.

Figure 5:
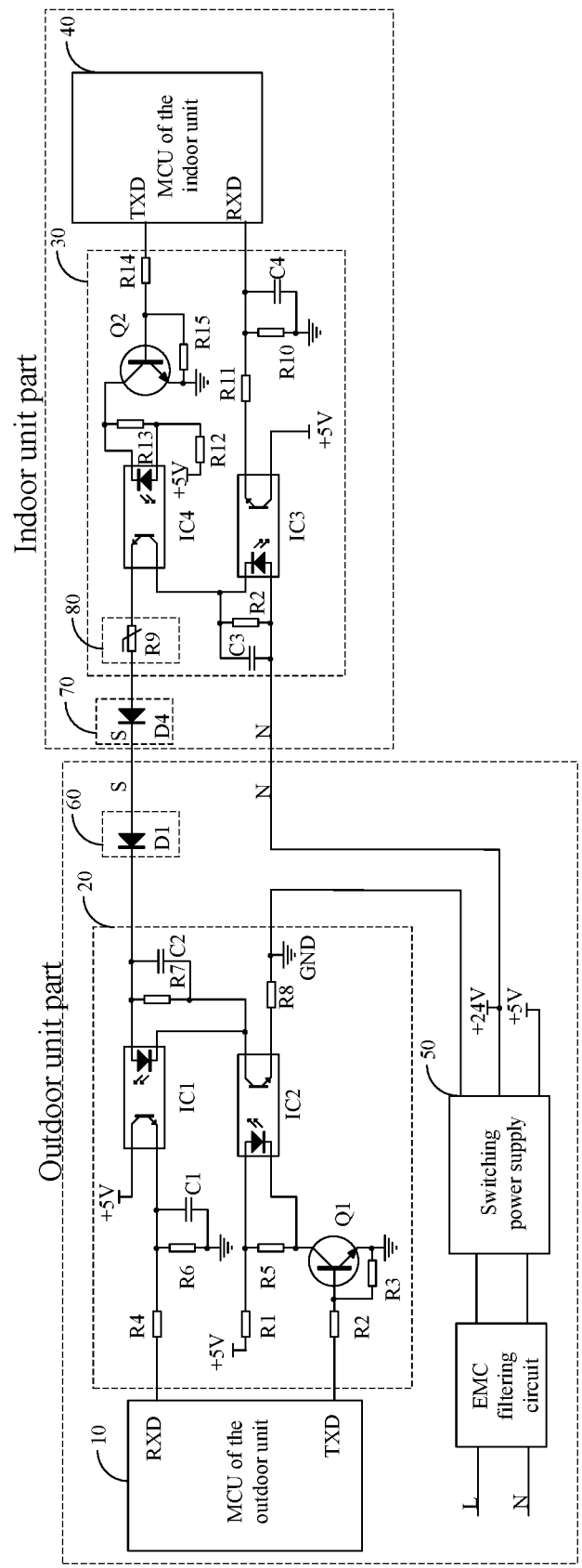
FIG. 5 is another circuit structural diagram of the air conditioner current loop communication circuit according to an embodiment of the present disclosure.

Further, the air conditioner current loop communication circuit shown in FIG. 5 differs from the air conditioner current loop communication circuit shown in FIG. 2 in that, in FIG. 5, the switching power supply module 50 is located at the outdoor unit side, the switching power supply module 50 outputs 24V DC power to the current loop communication loop via the AC N wire of the indoor unit side, and the direct current passes via the N wire of the outdoor unit side to a photocoupler IC3 of the indoor unit side, a photocoupler IC4 of the indoor unit side, a photocoupler IC1 of the outdoor unit side, and a photocoupler IC2 of the outdoor unit side and returns to the DC 24V negative pole. The negative pole of 24V is connected to the outdoor unit current loop communication module 20, and can be, e.g., the emitter of the transistor of the photocoupler IC2.

Figure 6:
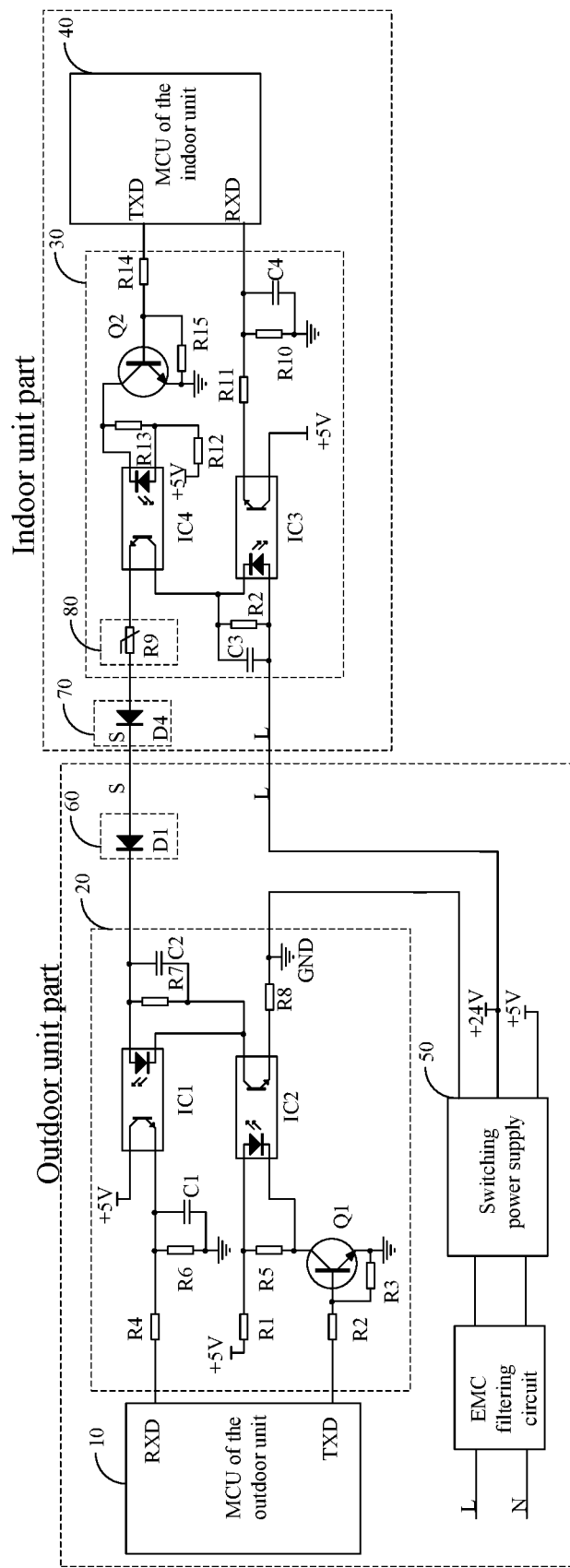
FIG. 6 is another circuit structural diagram of the air conditioner current loop communication circuit according to an embodiment of the present disclosure.

Further, the air conditioner current loop communication circuit shown in FIG. 6 differs from the air conditioner current loop communication circuit shown in FIG. 5 in that, in FIG. 6, the switching power supply module 50 is connected in series with the L wire of the AC power supply, the positive pole (+24V) of the output end of the switching power supply module 50 is connected to the L wire of the AC power supply, and the negative pole of the output end of the switching power supply module 50 is connected to the outdoor unit current loop communication module 20. The AC power N wire is not shown in FIG. 6. The AC power transmission for the indoor unit and the outdoor unit is through the L and N wires.

In the embodiments of the present disclosure, the air conditioner current loop communication circuit includes the switching power supply module 50. The switching power supply module 50 is connected in series to the communication connection S wire or the AC power connection wire to output the direct current to the current loop communication loop. In the present disclosure, the DC power output from the switching power supply module 50 is configured to replace the existing resistance voltage divider type DC power supply circuit, and is compatible with the existing current loop communication circuit connecting wires between the indoor unit and outdoor unit of the air conditioner, which solves the problems in the existing resistance voltage divider that the large power consumption of the voltage divider resistor causes large heat generation, and that the large volume of the voltage divider resistor is not suitable to the PCB layout.

In some embodiments, as shown in FIG. 2, the air conditioner current loop communication circuit further includes a unidirectional protection module 60 (unidirectional protection circuit) connected in series in the current loop communication loop to provide a unidirectional DC path for the current loop communication loop. In some embodiments, the unidirectional protection module 60 (first unidirectional protection module 60) includes a first diode D1. The first diode D1 is connected in series in a current loop communication loop, and the current in the loop is input from the positive pole of the first diode D1 and output from the negative pole of the first diode D1. When two of the three connection wires L, N, and S (such as L and S) of the indoor unit and the outdoor unit are reversely connected, high-voltage electricity is introduced into the current loop communication loop. At this time, the first diode D1 will prevent high voltage electricity from causing damage to other components such as the photocouplers in the loop due to high voltage overcurrent.

Further, in order to achieve better high-voltage protection, a unidirectional protection module can be set at each of the indoor unit side and the outdoor unit side. As shown in FIG. 2, in addition to the first unidirectional protection module 60 (first unidirectional protection circuit) at the outdoor unit side, a second unidirectional protection module 70 (second unidirectional protection circuit) is also connected at the indoor unit side. The first and second unidirectional protection modules 60 and 70 are located at the external interfaces of the communication wire S at the indoor unit and outdoor unit, respectively. The negative pole of the first diode D1 constituting the first unidirectional protection module 60 is connected to an output port (not shown) of the communication wire S, and the positive pole of the second diode D4 constituting the second unidirectional protection module 70 is connected to an output port (not shown) of the communication wire S. The first diode D1 and the second diode D4 can be configured to provide a better protection and prevent damages to other components in the indoor- and outdoor-side loops when a high voltage is introduced into the loop as a result of the indoor and outdoor unit connection wires being reversed.

Further, in some embodiments, as shown in FIG. 2, the air conditioner current loop communication circuit further includes an overcurrent protection module 80 (overcurrent protection circuit) connected in series in the current loop communication loop to provide an overcurrent protection for the current loop communication loop. In some embodiments, the overcurrent protection module 80 includes a positive temperature coefficient (PTC) resistor R9, which is connected in series in the current loop communication loop. In FIG. 2, the PTC resistor R9 is connected in series at the indoor unit side. In some other embodiments, the PTC resistor R9 can be connected in series at the outdoor unit side. Sometimes a large current may occur in the current loop communication loop. For example, as described above, the reverse connection of connection wires of the indoor and outdoor units may introduce a high voltage in the loop, which will cause the current in the loop to rise instantly. Due to the characteristics of the PTC resistor R9, when the current flowing through it increases, its temperature rises, and its resistance value rises rapidly. The increase of the resistance value enhances the current limiting function and reduces the current in the loop.

The present disclosure further provides an air conditioner. The indoor unit and the outdoor unit of the air conditioner communicate with each other through the air conditioner current loop communication circuit described above. For the specific implementation and effects, reference may be made to the foregoing embodiments, and details are not described herein again.

In the specification, the description of the terms "first embodiment," "second embodiment," "example" and the like means that a specific method, device, or feature described in conjunction with the embodiment or example is included in at least one embodiment or example of the present disclosure. In the specification, the illustrative representations of the above terms need not necessarily be directed to the same embodiment or example. Moreover, the particular features, methods, devices, or characteristics described may be combined in any suitable manner in any one or more embodiments or examples. In addition, without any contradiction, those skilled in the art may combine different embodiments or examples and features of the different embodiments or examples described in this specification.

The above are only some embodiments of the present disclosure, and thus do not limit the scope of the present disclosure. Under the concept of the present disclosure, the equivalent structural transformations made according to the present specification and the drawings, or direct or indirect applications to other related technical fields, and are included in the scope of the present disclosure.

What is claimed is:

1. An air conditioner current loop communication circuit comprising:
   an indoor unit current loop communication circuit and an outdoor unit current loop communication circuit connected to each other via a communication connection wire and an AC power connection wire to form a current loop communication loop, the AC power connection wire including an AC power live wire;
   an indoor microcontroller unit (MCU) and an outdoor MCU configured to communicate with each other through the current loop communication loop; and
   a switching power supply circuit connected in series to the communication connection wire or the AC power connection wire, and configured to output a DC power to the current loop communication loop, a positive pole of an output end of the switching power supply circuit being connected to the AC power live wire, and a negative pole of the output end of the switching power supply circuit being connected to the indoor unit current loop communication circuit or the outdoor unit current loop communication circuit.

2. The air conditioner current loop communication circuit of claim 1, wherein:
   the AC power connection wire further includes an AC power neutral wire; and
   the positive pole of the output end of the switching power supply circuit is further connected to the AC power neutral wire, and the negative pole of the output end of the switching power supply circuit is connected to the indoor unit current loop communication circuit.

3. The air conditioner current loop communication circuit of claim 1, wherein:
   the AC power connection wire further includes an AC power neutral wire; and
   the positive pole of the output end of the switching power supply circuit is further connected to the AC power neutral wire, and the negative pole of the output end of the switching power supply circuit is connected to the outdoor unit current loop communication circuit.

4. The air conditioner current loop communication circuit of claim 1, wherein the switching power circuit includes a switching transformer including an output winding configured to output a DC power to the current loop communication loop.

5. The air conditioner current loop communication circuit of claim 1, further comprising:
   a unidirectional protection circuit connected in series in the current loop communication loop to provide a unidirectional DC path for the current loop communication loop.

6. The air conditioner current loop communication circuit of claim 5, wherein the unidirectional protection circuit is connected in series in an indoor unit part of the current loop communication loop.

7. The air conditioner current loop communication circuit of claim 6, wherein the unidirectional protection circuit includes a diode connected in series in the indoor unit part of the current loop communication loop.

8. The air conditioner current loop communication circuit of claim 5, wherein the unidirectional protection circuit is connected in series in an outdoor unit part of the current loop communication loop.

9. The air conditioner current loop communication circuit of claim 8, wherein the unidirectional protection circuit includes a diode connected in series in the outdoor unit part of the current loop communication loop.

10. The air conditioner current loop communication circuit of claim 1, further comprising:
    a first unidirectional protection circuit connected in series in an indoor unit part of the current loop communication loop; and
    a second unidirectional protection circuit connected in series in an outdoor unit part of the current loop communication loop.

11. The air conditioner current loop communication circuit of claim 10, wherein:
    the first unidirectional protection circuit includes a first diode connected in series in the indoor unit part of the current loop communication loop; and
    the second unidirectional protection circuit includes a second diode connected in series in the outdoor unit part of the current loop communication loop.

12. The air conditioner current loop communication circuit of claim 1, further comprising:
    an overcurrent protection circuit connected in series in the current loop communication loop to provide an overcurrent protection for the current loop communication loop.

13. The air conditioner current loop communication circuit of claim 12, wherein the overcurrent protection circuit includes a positive temperature coefficient resistor connected in series in the current loop communication loop.

14. An air conditioner comprising:
    an indoor unit;
    an outdoor unit; and
    a current loop communication circuit configured to allow communication between the indoor unit and the outdoor unit, the current loop communication circuit including:
       an indoor unit current loop communication circuit and an outdoor unit current loop communication circuit connected to each other via a communication connection wire and an AC power connection wire to form a current loop communication loop, the AC power connection wire including an AC power live wire;
       an indoor microcontroller unit (MCU) and an outdoor MCU configured to communicate with each other through the current loop communication loop; and
       a switching power supply circuit connected in series to the communication connection wire or the AC power connection wire, and configured to output a DC power to the current loop communication loop, a positive pole of an output end of the switching power supply circuit being connected to the AC power live wire, and a negative pole of the output end of the switching power supply circuit being connected to the indoor unit current loop communication circuit or the outdoor unit current loop communication circuit.

15. An air conditioner current loop communication circuit comprising:
    an indoor unit current loop communication circuit and an outdoor unit current loop communication circuit connected to each other via a communication connection wire and an AC power connection wire to form a current loop communication loop;
    an indoor microcontroller unit (MCU) and an outdoor MCU configured to communicate with each other through the current loop communication loop;
    a switching power supply circuit connected in series to the communication connection wire or the AC power connection wire, and configured to output a DC power to the current loop communication loop; and a unidirectional protection circuit connected in series in the current loop communication loop to provide a unidirectional DC path for the current loop communication loop.

* * * * *